United States Patent
Muir

[11] 3,710,908
[45] Jan. 16, 1973

[54] VEHICLE ENGINE BRAKING SYSTEM
[75] Inventor: Earl B. Muir, Rolling Hills Estates, Calif.
[73] Assignee: White Motor Corporation, Cleveland, Ohio
[22] Filed: Feb. 19, 1970
[21] Appl. No.: 56,993

Related U.S. Application Data
[62] Division of Ser. No. 711,333, March 7, 1968, Pat. No. 3,525,317.

[52] U.S. Cl....................192/.084, 192/12 A, 74/878
[51] Int. Cl. ..............................................B60k 21/00
[58] Field of Search..........192/.084, .062, .046, .058, 192/.096

[56] References Cited

UNITED STATES PATENTS

| | | | |
|---|---|---|---|
| 2,781,114 | 2/1957 | Slee et al............................192/3 R X |
| 3,236,344 | 2/1966 | Wawrzinick et al..................192/.084 |
| 3,220,392 | 11/1965 | Cummins..............................123/97 B |

Primary Examiner—Benjamin W. Wyche
Attorney—Smyth, Roston & Pavitt

[57] ABSTRACT

A multiple-position switch is actuated by a throttle pedal that is spring-loaded for retraction from an engine idling position through a series of three successive retracted positions. At the first of the three retracted positions the multiple-position switch terminates combustion in the engine to create a light braking effect which is primarily the result of friction losses in the various moving parts of the engine and vehicle. At the second retracted position of the throttle the switch is effective to create engine braking action by holding the exhaust valves of the engine continuously in slightly open position. At the third retracted position of the throttle pedal the switch operates a butterfly valve in the exhaust manifold of the engine to provide back pressure in the manifold, the additional braking effect by the back pressure unexpectedly increasing the effectiveness of the braking effort by the partially open exhaust valves.

2 Claims, 8 Drawing Figures

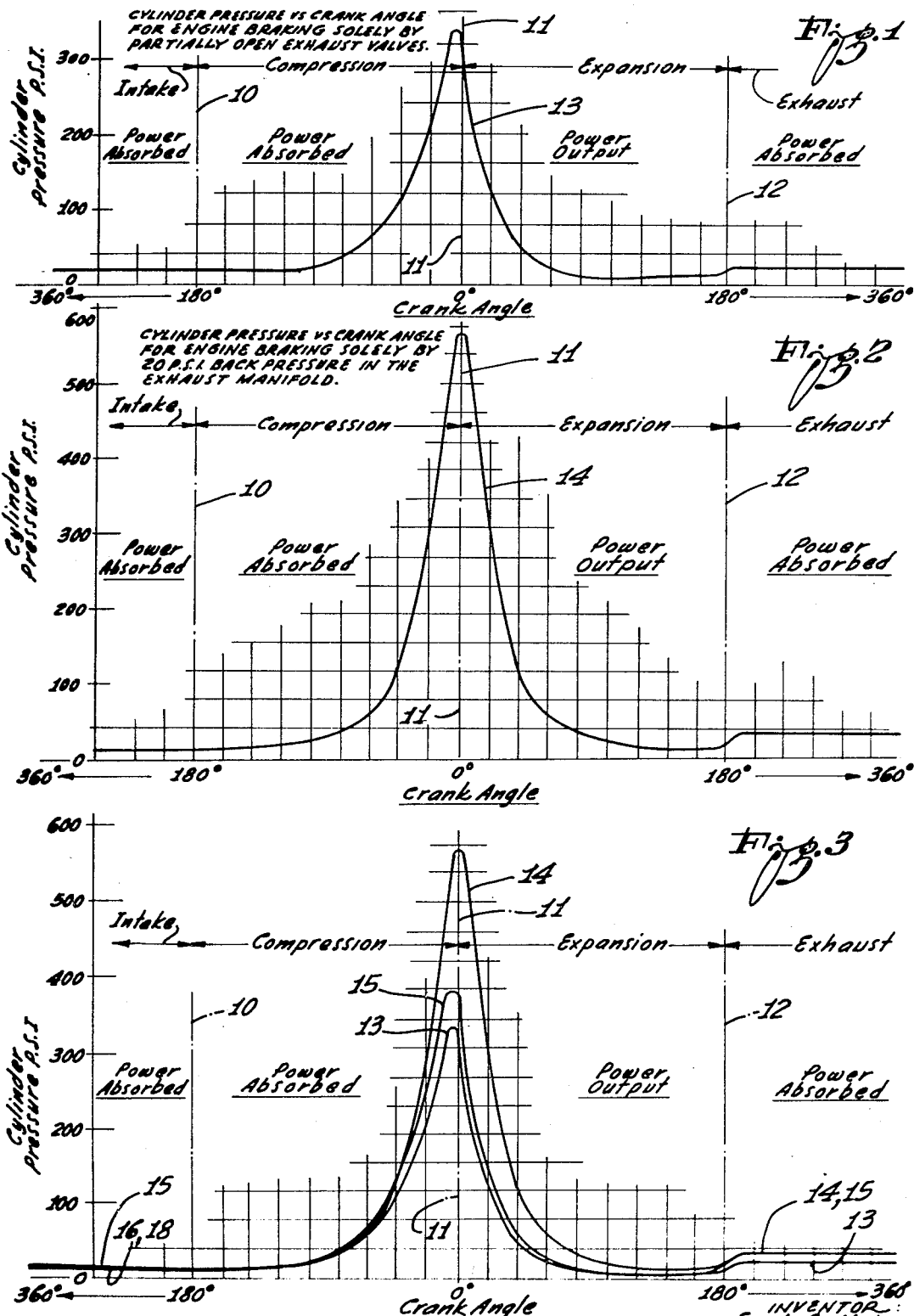

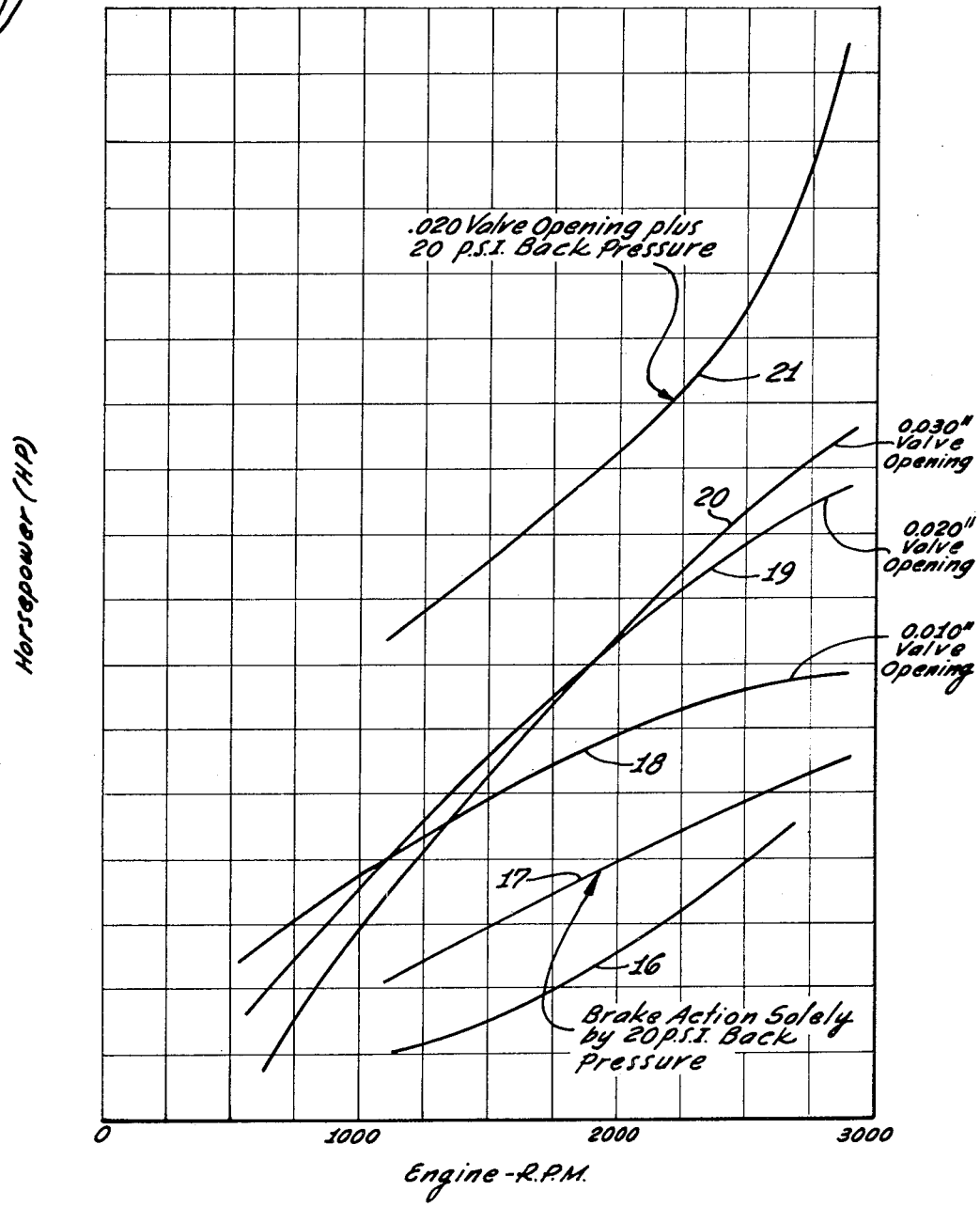

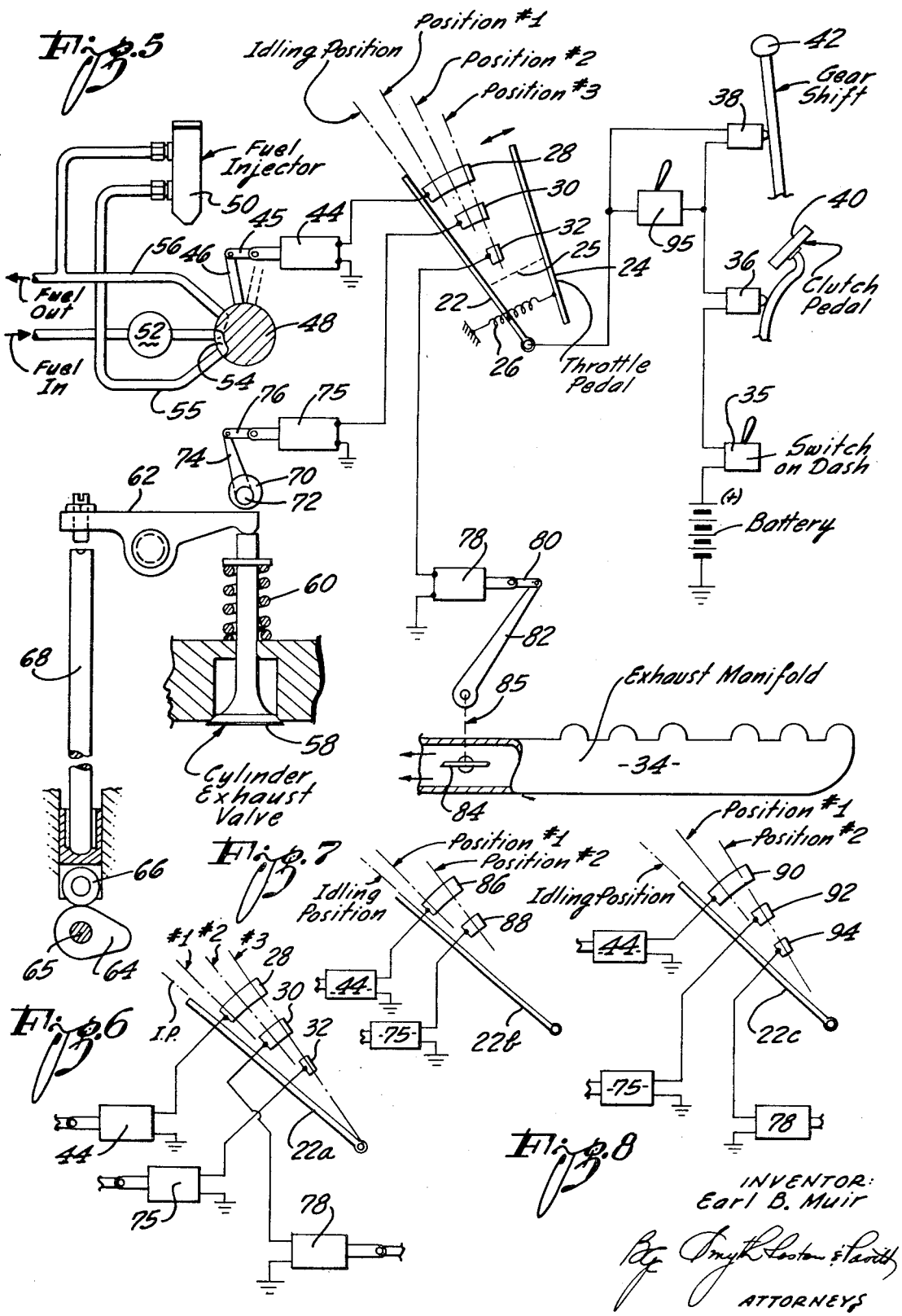

VEHICLE ENGINE BRAKING SYSTEM

CROSS-REFERENCE TO RELATED APPLICATION

This application is a divisional application of my copending application Ser. No. 711,333, now U.S. Pat. No. 3,525,317 which issued Aug. 25, 1970.

BACKGROUND OF THE INVENTION

Various arrangements have been employed heretofore to convert an internal combustion engine temporarily into a compressor by terminating combustion in the engine and cyclically venting engine cylinders to the atmosphere. For example, the Johnson U.S. Pat. No. 3,367,312, entitled ENGINE BRAKING SYSTEM, issued Feb. 6, 1968, provides means operable by the driver to advance the operation of the exhaust valves of an engine 180° of the rotation of the engine crank shaft to cause the exhaust valve to vent the cylinders at or near the ends of the compression strokes of the pistons.

It is also old in the art to serve the same purpose by restricting the outflow from the exhaust manifold of an engine to provide back pressure for power absorption. Such a braking system is disclosed, for example, in the Williams U.S. Pat. No. 2,805,656.

These two prior engine braking systems have certain inherent disadvantages. The disadvantage of advancing the timing of the exhaust valves in the first system is in the necessity of providing an auxiliary control system to operate all of the exhaust valves cyclically at the advanced timing throughout a braking period. Such an auxiliary control system with numerous moving parts is of substantial initial cost and requires periodic servicing. The second braking system eliminates the necessity of cyclic control through the braking period but the degree to which power is absorbed depends on the magnitude of the back pressure in the exhaust manifold and trouble developes eventually if the back pressure is relatively high, for example as high as 40 p.s.i. One purpose of the present invention is to avoid these disadvantages in the operation of an internal combustion engine as an auxiliary vehicle brake means.

Another purpose of the invention is to eliminate the necessity for the driver of a vehicle to manipulate any special or additional controls to convert the engine to braking operation. More particularly stated, the object is to make the brake system automatic in the sense that the braking action occurs automatically when desired with no need for the driver to depart from conventional driving procedure.

This automatic braking operation results in certain important advantages. In the first place, a driver operating for the first time a truck incorporating the present invention does not have to become familiar with a new manually operable control member and is not forced to learn new driving habits. Correct operating procedure in any sudden emergency is assured. In the second place, automatic braking action reduces fatigue by enabling the operator to drive in a relaxed manner at all times. In the third place, automatic braking operation results in achievement of the full potential of engine braking both to save fuel and to save wear on the mechanical brakes. In the fourth place, automatic braking by the engine as distinguished from the mechanical brakes makes it impossible for the vehicle engine to cool down unduly on a down hill run especially in winter time. Effective automatic engine braking makes it possible to change to the high gear before the vehicle loses so much speed as to make the desired gear shift prohibitive.

A further object of the invention is to provide what is commonly called "dead man control", i.e., a fail-safe braking control that becomes immediately effective in the event that the driver becomes incapacitated or is dislodged from the driver's seat.

A still further object of the preferred practice of the invention is to provide a graduated engine braking action in contrast to a conventional engine braking system in which the operator must choose between maximum engine braking action or no engine braking action at all. It is desirable to provide different degrees of retardation for different situations. For example, in anticipating a full stop at some distance ahead, a light braking action may be used for a large portion of the distance to decelerate the vehicle relatively gradually and then heavier braking action may be applied in the final approach. In using conventional mechanical hydraulic or air brakes, it is a simple matter to vary the degree of braking action as desired and the degree of braking action varies in a natural manner with the extent of movement of a manual brake control. It is highly desirable, therefore, to provide an engine braking system, the effectiveness of which varies in the same graduated manner in response to progressive movement of a brake control member.

SUMMARY OF THE INVENTION

The presently preferred embodiment of the invention is based on three basic discoveries which work together for the desired absorption of power by the engine.

The first discovery is that an internal combustion engine absorbs power for the purpose of a braking action if the various cylinders are vented by special ports or if either the intake valves or the exhaust valves of the various cylinders are prevented from closing beyond partially open positions for as long as the braking action is desired. The fact that either the intake valves or the exhaust valves are continuously at least partially open eliminates the necessity for cyclic valve actuation throughout a braking period and therefore a relatively simple control arrangement may be employed.

In the preferred embodiment of the invention the closing action of the exhaust valves is inhibited and the partially open exhaust valves admit somewhat more than the usual amount of air into the cylinders during the intake strokes of the pistons to result in greater masses of confined air at the beginning of the compression strokes. Consequently the power absorbed by the pistons on the compression strokes is increased. More important, however, power is lost by the heating of the air that escapes through the exhaust valves during the compression strokes and, of course, more power is dissipated by the escape of compressed air through the partially open exhaust valves during the expansion strokes of the pistons. The new result of these effects is that the power that the engine returns to the vehicle in the course of the expansion strokes of the pistons is much less than the power absorbed by the engine during the prior compression strokes, the difference accounting for the braking action of the engine that is achieved solely by keeping the exhaust valves from completely closing.

The second discovery is that if a second engine braking action is carried out simultaneously by employing a butterfly valve to create back pressure in the exhaust manifold, the two different engine braking actions complement each other. The flow through the exhaust valves causes power absorption on the combined compression and exhaust strokes while the back pressure in the manifold causes additional power absorption by an increase in the differential between the intake and exhaust portions of the engine cycle with no interference with each other.

The third discovery is that the combined effect of the two complementary engine braking actions is greater than the sum of the two separate braking effects. Thus unexpected cooperation of the two simultaneous braking actions is attributed in large part to the fact that the manifold back pressure crowds more air through the partially open exhaust valves into the cylinders on the intake strokes and during the early portions of the compression strokes. Thus, keeping the exhaust valves open together with maintaining elevated pressure in the exhaust manifold results in a substantial degree of supercharging to increase the amount of power that is absorbed by the engine on the combined compression and exhaust strokes. The pressure that resists the compression stroke of a piston is substantially higher than the resisting pressure that would be created by partially open exhaust valves in the absence of manifold back pressure.

Since the net braking effect achieved on the compression and expansion strokes taken together depends on the release of compressed air on the expansion strokes, it would seem at first thought that raising the back pressure in the exhaust manifold would greatly lessen the venting of compressed air on the expansion strokes and thus would greatly reduce the power absorbing effect of the partially open exhaust valves. It so happens, however, that in the absence of manifold back pressure, the pressure differential across the partially open exhaust valves far exceeds the critical pressure ratio above which the rate of flow does not increase. When a back pressure, for example a back pressure of 20 p.s.i., is created in the exhaust manifold, the critical pressure ratio across the partially open exhaust valves is still exceeded through such a large portion of the expansion stroke that the effect of the back pressure on the venting action is relatively insignificant.

The features and advantages of the invention may be understood from the following detailed description and the accompanying drawings.

BRIEF DESCRIPTION OF THE DRAWINGS

FIG. 1 is a graph showing cylinder pressure vs. crank angle for engine braking action that is accomplished solely by continuously at least partially opening either the intake valves or the exhaust valves;

FIG. 2 is a similar graph showing cylinder pressure vs. crank angle for engine braking action accomplished solely by maintaining a back pressure of approximately 20 p.s.i. in the exhaust manifold of the engine;

FIG. 3 is a similar graph which repeats the curves of FIGS. 1 and 2 and in addition shows cylinder pressure vs. crank angle for engine braking action accomplished by preventing complete closing of the exhaust valves and simultaneously maintaining approximately 20 p.s.i. back pressure in the exhaust manifold;

FIG. 4 is a graph showing the power absorbed at different engine speeds, some curves showing the power that is absorbed solely by holding the exhaust valves open to various degrees during the portion of the engine cycle when the exhaust valves are normally closed, one curve showing how power is absorbed solely by maintaining back pressure in the exhaust manifold, and still another curve showing how power is absorbed when the exhaust valves are prevented from closing completely while a back pressure is simultaneously maintained in the exhaust manifold;

FIG. 5 is a schematic view illustrating the presently preferred embodiment of the invention;

FIG. 6 is a fragmentary schematic view indicating how the arrangement shown in FIG. 5 may be modified if desired;

FIG. 7 is a fragmentary schematic view illustrating an embodiment of the invention which relies solely on limiting the closing action of the exhaust valves for engine braking action; and FIG. 8 is a similar view illustrating another embodiment of the invention.

DESCRIPTION OF THE PREFERRED EMBODIMENT OF THE INVENTION

FIG. 1 refers to a method of causing an internal combustion engine to absorb power solely by preventing either the intake valves or the exhaust valves of the engine from closing completely and shows how the operating cycle is carried out by two complete revolutions of the crank shaft. The operating cycle of a given cylinder is divided into four parts corresponding to the four strokes of the piston in the cylinder, namely, the intake stroke which extends from top dead center at the left margin of the chart to the bottom dead center of the crank shaft that is represented by the vertical line 10; the compression stroke extending from the bottom dead center position of the crank shaft represented by the vertical line 10 to the top dead center position represented by the central vertical line 11; the expansion stroke extending from the top dead center position of the crank shaft represented by line 11 to the bottom dead center that is represented by the verical line 12; and the exhaust stroke extending from the bottom dead center position of the crank shaft represented by vertical line 12 to the top dead center position of the crank shaft that is represented by the right end of the chart. For the purpose of providing room for clearly depicting the central compression and expansion strokes, the opposite end portions of the chart that represent the intake stroke and exhaust strokes respectively are compressed horizontally.

A small amount of power is absorbed on the initial intake stroke and additional power is absorbed by the engine on the final exhaust stroke. The substantial amount of power absorbed on the compression stroke may be measured by the area defined by the pressure curve 13 between the two vertical lines 10 and 11 and the power that is returned to the vehicle by the engine on the expansion stroke is equal to the area defined by the curve 13 between the vertical lines 11 and 12. It can be seen that the first area substantially exceeds the second area, the difference being the net power absorbed by the engine for the desired braking effect.

The first area on the left side of the vertical line 11 is greater than the second area on the right side of the line because the leaking exhaust valves release air from the cylinders during the compression and expansion strokes to cause the air pressure in the cylinders to drop abruptly during the first part of the expansion strokes.

In FIG. 2 the curve 14 represents the pressure changes in a cylinder in a cycle of operation extending over two revolutions of the crankshaft when the braking action relies solely on the maintenance of a back pressure of 20 p.s.i., in the exhaust manifold, the intake and exhaust valves operating in the normal manner. It is to be noted that in FIG. 2 the portion of the curve 14 in the third space that represents the expansion stroke is a mirror image of the portion of the curve that lies in the second space that represents the compression stroke, there being no power absorption by the combination of these two strokes. Thus, the power absorbed by the engine for the desired braking effect is the power absorbed on the intake stroke plus the power absorbed on the exhaust stroke.

FIG. 3 includes the pressure curve 13 of FIG. 1 that represents the braking action provided solely by preventing complete closure of the exhaust valves and includes curve 14 of FIG. 2 which represents the braking effect achieved solely by maintaining approximately 20 p.s.i. back pressure in the exhaust manifold. In addition, FIG. 3 shows a third pressure curve 15 which represents the composite braking effect that is obtained by holding the exhaust valves partially open during the periods when they are normally closed and at the same time maintaining a back pressure of approximately 20 p.s.i. in the exhaust manifold.

It can be seen that the power absorbed on the exhaust stroke is the same for both curves 14 and 15. In other words employing the kinds of braking action simultaneously does not reduce the power that is absorbed by maintaining back pressure in the exhaust manifold.

The height of the peak of the new pressure curve 15 is substantially less than the height of the peak of the pressure curve 14 that represents braking action solely by maintaining back pressure in the exhaust manifold. It is to be remembered, however, that the height of the peak of the pressure curve 14 is without significance with respect to braking action because the peak is symmetrical with respect to the top dead center line 11, the power output on the expansion stroke equaling the power absorbed on the pressure stroke.

The surprising fact is that the peak of pressure curve 15 that represents the two simultaneous braking actions is substantially higher than the peak of pressure curve 13 and since the higher peak of the pressure curve 15 is offset to the left of the top dead center line 11 the result is a substantially greater differential between power absorption and power output on the compression and expansion strokes. In other words, the difference between the areas defined by the curve 15 on the left and right sides of the top dead center line is substantially greater than the difference between the areas defined by the curve 13 on the left and right sides of the top dead center line. Thus FIG. 3 shows graphically that maintaining back pressure in the exhaust manifold while the closing action of the exhaust valves is inhibited provides the expected power absorption on the intake and exhaust strokes and in addition increases the power absorption on the compression and expansion strokes.

In FIG. 4 wherein horsepower absorbed for breaking effect is plotted against engine RPM, the lower curve 16 represents the braking effect of merely terminating combustion in the cylinders of the engine, the braking effect then being created primarily by the friction of the moving parts of the engine and of the vehicle. The next higher curve 17 indicates the power absorbed by the engine solely by virtue of maintaining 20 p.s.i. back pressure in the exhaust manifold.

The next three curves represent the braking effect that is obtained solely by keeping the exhaust valves of the engine open to various degrees during the periods when the exhaust valves are normally closed. Curve 18 represents the power absorbed by holding the exhaust valves open by 0.010 inch; curve 19 represents the effect of holding the exhaust valves open by 0.020 inch; and curve 20 shows the power absorbed when the exhaust valves are held open by 0.030 inch. It is apparent from an inspection of curves 18, 19 and 20 that increasing the degrees to which the exhaust valves are held open raises the power that is absorbed in the higher ranges of engine speed but lowers the power that is absorbed in the lower ranges of engine speed. It is to be understood, of course, that all of the curves in FIG. 4 relate to a particular engine, which in this instance is an eight cylinder diesel engine but in the operation of any engine the various curves will be of the general character shown in FIG. 4. In each instance the decision as to what degree the exhaust valves are to be held open will be reached by balancing the desirability on the one hand of opening the exhaust valves substantially for relatively high power absorption at the higher engine speeds and, on the other hand, the need for adequate braking action at the lower engine speeds that cannot be met if the exhaust valves are too wide open. In this particular instance opening the exhaust valves by 0.020 inch is a practical compromise.

Curve 21 in FIG. 4 shows the power that is absorbed when both braking actions are employed simultaneously. The exhaust valves are held continuously open by 0.020 inch and at the same time a back pressure of approximately 20 p.s.i. is maintained in the exhaust manifold.

It will be apparent to those skilled in the art that the basic concepts represented by FIGS. 1-4 may be carried out in various ways in various practices of the invention. By way of example, FIG. 5 indicates schematically how the invention may be embodied in a truck that is powered by a diesel engine. An important feature of this particular embodiment of the invention is the concept of making available different levels of power absorption typified by curves 16, 17, 19 and 21 in FIG. 4 for use selectively by the truck operator. Another feature of this particular embodiment of the invention is the concept of controlling the various levels of power absorption by means of the throttle pedal, this concept making it unnecessary to add an additional control for operating the engine as an auxiliary brake. Still another feature is the concept of making the engine braking operation not only automatic but also fail-safe.

In FIG. 5 a multiple position switch represented by the switch arm 22 is mechanically operated by the throttle pedal 24 as indicated by the dotted line 25. As indicated diagrammatically the throttle pedal 24 is biased to retract by a suitable spring means 26, the same spring means serving to bias the switch arm 22 towards a maximum position of retraction which is labeled position No. 3.

Under normal driving conditions when the throttle pedal 24 is depressed to supply fuel to the engine, the switch arm 22 is depressed below the idling position that is so labeled in FIG. 5. When it is desirable to slow down the vehicle, the driver relaxes the pressure on the throttle pedal to permit the switch arm 22 to retract to a selected degree in accord with whatever degree of braking effectiveness is desired. If the throttle pedal is permitted to retract to place the switch arm 22 at position No. 1 in FIG. 5 the switch arm cooperates with a relatively long contact 28 to terminate combustion in the cylinders of the engine. If the switch arm 22 contracts further to position No. 2 the switch arm not only cooperates with the long contact 28 but also with a contact 30 to cause the exhaust valves of the engine to be opened to a predetermined degree while combustion is still interrupted. Finally, if the throttle pedal is permitted to retract to its limit position the switch arm 22 retracts to position No. 3 where it not only cooperates with contacts 28 and 30 but also cooperates with the third short contact 32 to create back pressure in the exhaust manifold 34.

In the control arrangement shown in FIG. 5 the switch arm 22 is in series with three switches, namely a dashboard switch 35, a clutch pedal switch 36 and a gearshift switch 38. The dashboard switch 35 may be used by the driver to deenergize the braking circuit whenever desired. The clutch pedal switch 36 closes only when the clutch pedal 40 is released to engage the clutch of the vehicle and the gearshift switch 38 closes only when the gearshift lever 42 is out of its neutral position.

Since FIG. 5 relates to a truck powered by a diesel engine, the circuit that includes the long contact 28 terminates combustion in the engine by terminating the injection of fuel into the cylinders of the engine. For this purpose the long contact 28 is in series with a solenoid 44 which is operatively connected by a link 45 to an arm 46 for rotating a valve member 48. In this particular instance, the fuel injectors 50 of the engine are of the hydraulic type that are operated by pressure pulses created by a fuel pump 52. Since the plungers (not shown) of the hydraulic fuel injectors 50 serve merely as check valves in a well known manner and are actuated by hydraulic pressure pulses instead of being actuated by cams, it is not necessary to provide any special means to immobilize the injector plungers when the fuel pump is cut off.

When the valve member 48 is in the normal position shown in solid lines in FIG. 5 for normal power operation of the engine, a peripheral cavity 54 of the valve member places the output of the fuel pump 52 in communication with a passage 55 for supplying fuel to the various injectors 50. When the solenoid 44 is energized, however, the valve member 48 is rotated to an alternate position indicated by dotted lines which cuts off the passage 55 and places the peripheral cavity 54 of the valve member in position to direct the output of the fuel pump 52 to a low pressure return passage 56 thereby terminating combustion in the various engine cylinders.

If the vehicle engine incorporates an ignition system, the solenoid 44 could be used to open the ignition circuit and thus automatically promote safety in the event of a crash.

Each of the exhaust valves 58 of the various cylinders of the engine is biased to a closed position by the usual valve spring 60 and is periodically opened by a corresponding rocker arm 62. In the usual manner, the rocker arm is actuated by a corresponding cam 64 on a cam shaft 65, the cam cooperating in the usual manner with a follower 66 on the lower end of a push rod 68.

For the purpose of holding the various exhaust valves 58 in partially open position in the periods in which they are normally closed, an eccentric 70 corresponding to each exhaust valve is mounted on a shaft 72 that is controlled by an operating arm 74. Normally each of the eccentrics 70 is in a rotary position to provide adequate room for normal operation of the corresponding rocker arm 62. Whenever the contact 30 is energized by the switch arm 22, however, a circuit is closed through a solenoid 75 that is connected by a link 76 to the operating arm 74 and the energized solenoid rotates each of the eccentrics 70 to a rotary position that blocks the return movement of the corresponding rocker arm 62. In this manner, each of the exhaust valves 58 is held continuously open to a predetermined degree as long as a braking action by the engine is desired.

The third contact 32 serves to energize a solenoid 78 that is connected by a link 80 to an opening arm 82, the operating arm being connected as indicated by the dotted line 85 to a butterfly valve 84 in the exhaust manifold. Normally the butterfly valve 84 is in the open position shown in FIG. 5 to permit free outflow from the exhaust manifold 34. Whenever the solenoid 78 is energized, however, the butterfly valve is swung sufficiently towards a closed position to restrict the outflow from the exhaust manifold sufficiently to create a back pressure of approximately 20 p.s.i.

From the foregoing description it is apparent that the switch arm 22 in combination with contact 28, solenoid 44 and valve 48 constitutes a first control means to terminate combustion in the engine; the switch arm in combination with contact 30, solenoid 75 and eccentric 70 constitutes a second control means to hold the exhaust valves partially open; and the switch arm in combination with contact 32, solenoid 78 and butterfly valve 84 constitutes a third control means to create back pressure in the exhaust manifold. It is also apparent that the throttle pedal 24 is a master control to which the first, second and third control means respond.

The manner in which the braking system functions for its purpose may be readily understood from the foregoing description of FIG. 5. It is apparent that if the dash switch 35 is closed and at the same time the clutch is engaged and the transmission is out of neutral, the switch arm 22 will be energized for cooperation with the three contacts 28, 30 and 32. If the throttle pedal 24 is permitted to retract from its idling position sufficiently to place the switch arm 22 at its No. 1 position, combustion in the vehicle engine is terminated to create the light braking effect that is indicated by curve 16 in FIG. 4. If the throttle pedal is permitted to retract further to place the switch arm 22 at its No. 2 position, the switch arm continues to cooperate with the contact 28 to prevent combustion in the cylinders of the engine and at the same time cooperates with contact 30 to hold all of the exhaust valves at partially open positions to create the engine braking effect that is represented by curve 19 in FIG. 4. If the throttle pedal 24 is completely relaxed the switch arm 22 assumes its No. 3 position at which it cooperates with contact 28 to prevent combustion in the engine cylinders and at the same time cooperates with contacts 30 and 32 to keep the exhaust valves partially open and additionally to close the butterfly valve 84. Thus the result of moving the switch arm 22 to position No. 3 is the engine braking effectiveness that is represented by curve 21 in FIG. 4.

It is apparent that the engine braking action is automatic in the sense that the braking effect is automatically created whenever the driver releases pressure on the throttle pedal to decelerate the vehicle. Since the driver has the choice of three different degrees of braking effectiveness he can drive the truck efficiently with a degree of retardation that is appropriate for any particular situation. Since the braking action by the engine is automatic the driver is caused to rely primarily on engine braking. The conventional mechanical brakes are held in reserve for emergencies and overheating of the mechanical brakes on long runs downgrade is avoided. If the driver becomes disabled for any reason or if the driver is dislodged from the driver's seat in an accident, the engine braking system operates instantly with maximum effect.

As heretofore pointed out, the three degrees of braking action correspond to the curves 16, 19 and 21 in that order in FIG. 4. If it is desired to change this sequence, it is merely necessary to change the wiring connections to the three contacts 28, 30 and 32. For example, FIG. 6 shows the contact 30 connected to solenoid 78 instead of being connected to the solenoid 75 that shows the contact 32 connected to the solenoid 75 instead of being connected to the solenoid 78. With this new wiring arrangement, placing the switch arm 22a at its No. 2 position closes the butterfly valve 84 to create the braking effect represented by curve 17 in FIG. 4 instead of the braking effect represented by curve 19.

FIG. 7 indicates the construction of another embodiment of the invention in which the engine braking action is obtained solely by holding the exhaust valves of the cylinders partially open. The switch arm 22b in FIG. 7 is shown at the idling position of the throttle pedal. The switch arm 22b may be retracted to position No. 1 where the switch arm cooperates with contact 86 to energize the previously mentioned solenoid 44 for terminating combustion in the engine. The switch arm 22b may be further retracted to position No. 2 where the switch arm not only cooperates with contact 86 but also cooperates with contact 88 to energize the previously mentioned solenoid 75 for holding the various exhaust valves in partially open position.

FIG. 8 indicates the construction of still another embodiment of the invention in which the switch arm 22c is shown at the idling position. The switch arm 22c may be retracted to position No. 1 where it cooperates with a contact 90 to energize the solenoid 44 for terminating combustion in the engine. When the switch arm 22c is retracted to the limit position which is designated position No. 2, the switch arm not only cooperates with the contact 90 but also cooperates with a contact 92 to energize the solenoid 75 for holding the exhaust valves partially open and cooperates with a third contact 94 to energize the previously mentioned solenoid 78 to close the butterfly valve 84.

The arrangement shown in FIG. 5 includes a normally open switch 95 which may be omitted if desired. This switch is within convenient reach of the driver and when closed shunts the gear shift switch 38 to make the gear shift switch ineffective. The advantage of providing switch 95 is that the driver may close it temporarily to make it easy to change gears for acceleration up a grade. To carry out such a gear shift, the driving and driven gears in the transmission must be synchronized by deceleration of the engine and in the operation of a conventional diesel truck the engine decelerates so gradually that too often the vehicle loses too much momentum before the gear shift can be made. With switch 95 closed, the driver may release the throttle pedal and place the gears in neutral to permit prompt deceleration of the engine by the engine braking system. When the engine decelerates sufficiently for the synchronism of the desired gears, the driver makes the gear change and then may restore the switch 95 to its normal open position.

My description of the presently preferred practice of the invention will suggest various changes, substitutions and other departures from my disclosure within the spirit and scope of the appended claims.

I claim:

1. In a vehicle having a clutch with the vehicle powered by an internal combustion engine having cylinders with corresponding pistons and having a set of intake valves and a set of exhaust valves in communication with the exhaust manifold, the improvement for operating the engine as a brake for the vehicle, comprising:

a first control means to terminate combustion in said cylinders for a braking period;

second control means to hold said exhaust valves partially open continuously throughout the braking period;

third control means to restrict outflow from the exhaust manifold without completely cutting off the outflow during the braking period thereby to create back pressure in the exhaust manifold; and means responsive to the clutch to prevent operation of said first, second and third control means when the clutch is disengaged.

2. In a vehicle powered by an internal combustion engine through a clutch and a transmission, said engine having a throttle and a plurality of cylinders with corresponding exhaust valves in communication with an exhaust manifold, the improvement for operating the engine as a brake, comprising:

said throttle having a range of movement for supplying fuel to the engine at different rates and being retractable from said range to first, second and third retracted positions in a retracted range of positions;

first control means to terminate combustion in said cylinders for a braking period;
second control means to prevent complete closure of said exhaust valves during the braking period;
third control means to restrict outflow from said exhaust manifold thereby to create back pressure in the manifold during the braking period,
said first control means being responsive to retraction of the throttle into said retracted range,
one of said second and third control means being responsive to retraction of the throttle from said first position to said second and third position,
the other of said second and third control means being responsive to retraction of the throttle to said third position; and
means responsive to said clutch to prevent operation of said first, second and third control means when the clutch is disengaged.

* * * * *